J. L. HULBERT.
MILKING MACHINE SYSTEM.
APPLICATION FILED OCT. 27, 1920.
1,407,034.
Patented Feb. 21, 1922.
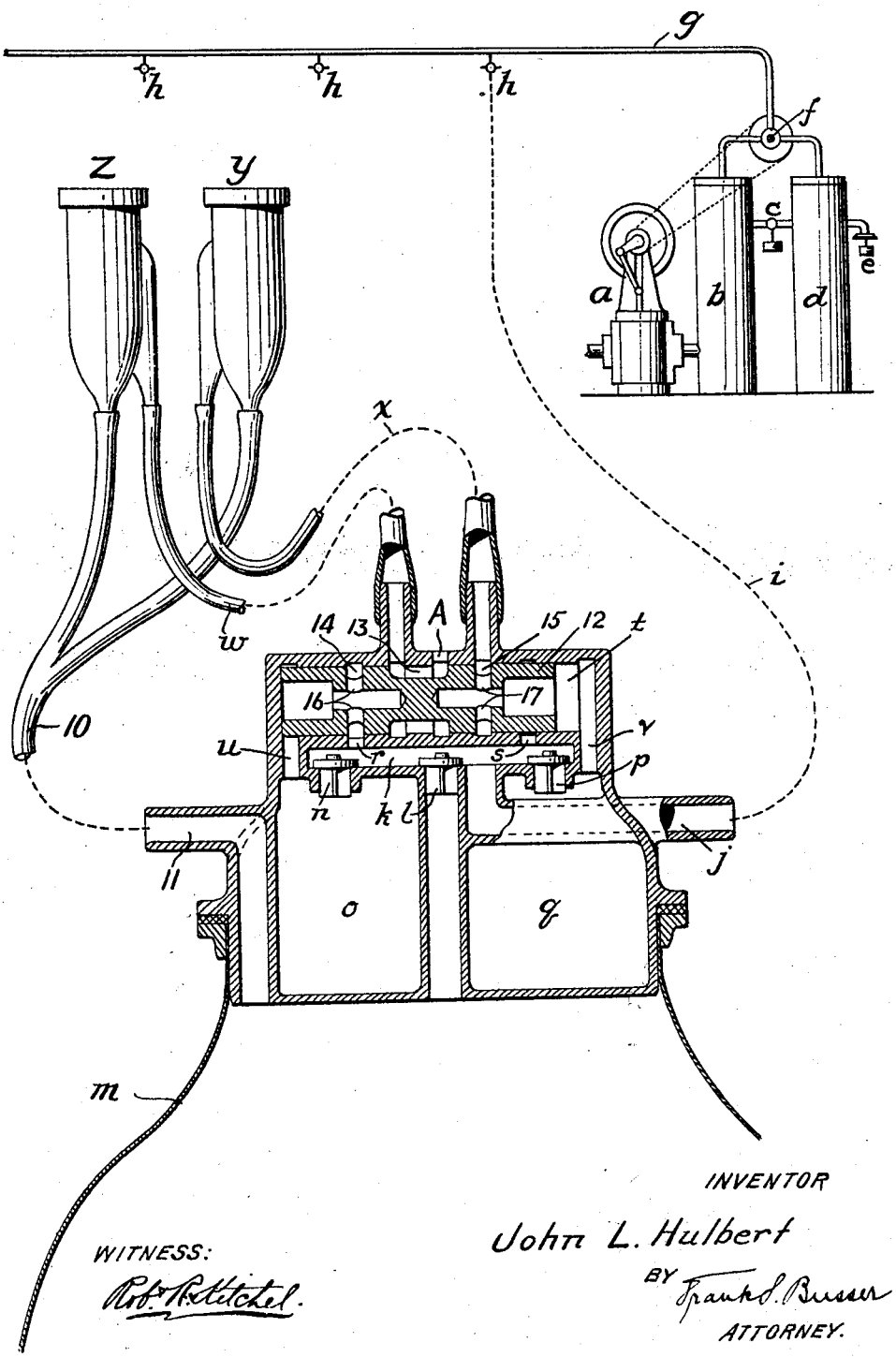
WITNESS:
Rob'. R. Mitchel.
INVENTOR
John L. Hulbert
BY Frank S. Busser
ATTORNEY.

UNITED STATES PATENT OFFICE.

JOHN L. HULBERT, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING-MACHINE SYSTEM.

1,407,034.   Specification of Letters Patent.   Patented Feb. 21, 1922.

Application filed October 27, 1920. Serial No. 419,876.

*To all whom it may concern:*

Be it known that I, JOHN L. HULBERT, a citizen of the United States, residing at Poughkeepsie, county of Dutchess, and State of New York, have invented a new and useful Improvement in Milking-Machine Systems, of which the following is a full, clear, and exact description, reference being had to the accompanying drawings, which form a part of this specification.

My invention relates to means for producing pulsations in the teat cups of milking machines.

The object of my invention is to produce in the teat cups pulsations which shall have alternate high and low pressure periods of equal duration.

Patent No. 1,196,001, issued August 29, 1916, to Meredith Leitch, shows a milking machine system in which two teat cups receive pulsations alternately from a valve controlled by a vacuum wave in a pipe line which is also used for exhausting the milk pail.

It has been found that the character of the high pressure wave varies from that of the low pressure wave in such a way that the duration of the pause at one end of the stroke is not the same as that at the other end. The duration of high pressure in one teat cup pulsation chamber is therefore different from that of high pressure in the other teat cup pulsation chamber. With the alternating system of milking this is very objectionable.

One object of my invention is to provide means whereby the actions in the two alternately operated teat cups will be equal.

I accomplish this, in the preferred embodiment of my invention herein described, by setting up, in the pipe line, double the number of waves used in the teat cups, alternate waves being of one strength while the others are of a different strength, and provide a reversing device which will be actuated in both directions by the waves of one strength, while the other waves place the reversing device in a condition to be affected by the first mentioned waves.

The accompanying drawing, which illustrates such preferred embodiment of my invention, shows to a small scale a diagrammatic representation of an entire system, and to a larger scale two teat cups and a milk pail top containing my improved pulsator.

$a$ is a vacuum pump for exhausting air directly from a high vacuum tank $b$ and through a pressure reducing valve $c$ from a low vacuum tank $d$. A relief valve $e$ admits air to tank $d$ whenever the vacuum exceeds a predetermined value. A valve $f$, driven from the same motor that drives the pump, connects a pipe line $g$ alternately with tanks $b$ and $d$, causing alternate high and low vacuum waves therein.

At convenient points on the pipe line $g$ are connection cocks $h$ to receive flexible pipes $i$ of a milking machine unit and which communicate with a passage $j$ in the pail top. The passage $j$ communicates with a passage $k$ which is connected with the interior of the milk pail $m$ by a port controlled by a check valve $l$. A second check valve $n$ controls a port leading from reservoir $o$ to the passage $k$ and a third check valve $p$ controls a similar port leading from reservoir $q$ to said passage.

Two ports $r$ and $s$ open from passage $k$ through the sides of a cylinder $t$. A passage $u$ extends from the reservoir $o$ to one end of the cylinder and a passage $v$ from the reservoir $q$ to the other end of the cylinder. An atmospheric inlet port A leads through the center of side of the cylinder $t$. Intermediate the atmospheric port A and the previously mentioned ports $r$ and $s$ are two ports and pipes $w$ and $x$ which lead to the pulsation chambers of two teat cups $y$ and $z$. Flexible pipes 10 lead from the teat chambers of these cups to a passage 11 communicating with the inside of the milk pail.

Mounted for reciprocation in the cylinder $t$ is a piston valve 12, having around its center a wide annular groove 13 and between the center and ends two narrower annular grooves 14 and 15. These grooves are connected by ports 16 and 17, respectively, with hollow ends of the piston.

When in operation the pump $a$ maintains a high degree vacuum, usually, for example, about 15″ of mercury in the tank $b$; and through the pressure reducing valve $c$ maintains a lesser degree of vacuum, usually, for example, about 10″ of mercury in tank $d$. Valve $f$, by connecting pipe $g$ alternately with tanks $b$ and $d$, causes vacuum waves in the pipe $g$. These waves are transmitted along the pipe and through the flexible pipe $i$ to the pail top. When the pail is first connected with the pipe $g$, air is exhausted from the pail $m$ continuously, through the check valve $l$, until the pressure in the pail is less than the highest pressure in the pipe $g$, or below the pressure in tank $d$. Thereafter, at each high vacuum wave, more air is exhausted until the pressure in the pail $m$ closely approaches the minimum pressure in the pipe $g$, or the pressure in the tank $b$. Air is also exhausted through the check valves $n$ and $p$ from the chambers $o$ and $q$.

With the piston 12 in the position shown, the next high pressure wave will send air through the port $r$, annular groove 14 and port 16 to the left end of the piston. The right end of the piston is by the port $v$ in communication with chamber $q$ which has been exhausted to the lowest pressure. The valve 12 will therefore move toward the right. As soon as it starts to move, air can pass around its end, increasing the pressure in the chamber $o$. Expansion of this air after the port $r$ has been closed will continue the movement of the piston until it reaches the right hand end of its stroke. The next low pressure wave will exhaust air from the chamber $o$ past the check valve $n$ until the pressure in the chamber reaches a minimum. At the same time air is exhausted past the valve $p$ from the chamber $q$, passage $v$ and also through port 17, groove 15 and port $s$ at the right hand end. As both ends of the piston are subjected to full vacuum, there will be no movement. The succeeding high pressure wave will pass through the port $s$ in the cylinder wall, the groove 15 and port 17 in the piston, raising the pressure at the right hand end and moving the piston to the left. The piston is now in its original position and the cycle will be repeated.

With the piston in the position shown, air is exhausted from the pulsation chamber of the cup $y$ through the pipe $x$, annular groove 15, port 17 and port $v$ into the chamber $q$. At the same time air is admitted at atmospheric pressure through the port A, annular groove 13 and pipe $w$ to the pulsation chamber of the cup $z$. With the piston at the right hand end of its stroke, the connections are such that air is admitted to the pulsation chamber of the cup $y$ and exhausted from that of the cup $z$.

From the above, it may be seen that the conditions in the pipe $g$ which cause a movement of the piston valve 12 in one direction are the same as those which cause its movement in the other direction. The durations of pauses at the ends of its strokes will therefore be equal and the actions in the cups will be necessarily equal.

I have described, for example, the vacuum wave as having an initial amplitude of from 10" of mercury to 15" of mercury. The wave at distant parts of the pipe may have a much less amplitude. I may also find it necessary in some long pipe lines to use a greater initial amplitude of wave. All such waves are intended to be included in the scope of the claims.

The term "pressure" employed in the claims is intended to include, but not to be limited to, atmospheric pressure, and the terms "vacuum waves" and "suction" are intended to comprise different degrees of absolute pressure lower than the pressure employed to compress the teats.

Having now fully described my invention, what I claim and desire to protect by Letters Patent is:—

1. In a milking machine system, in combination, a pulsation pipe line, means to cause pneumatic pulsations therein, a set of teat cups, and means operable by said pneumatic pulsations to cause, in the teat cups, pulsations of half the frequency of those in the pulsation pipe line.

2. In a milking machine system, in combination, a pulsation pipe line, means to cause vacuum waves therein, a set of teat cups, and means controllable by said vacuum waves to cause, in the teat cups, pulsations having half the frequency of those in the pulsation pipe line.

3. In a milking machine system, in combination, a teat cup, a pulsation pipe line, means to cause alternate pneumatic waves of different strength therein, a reciprocable pulsator valve adapted to connect the teat cup alternately with pressure and suction, and means to effect a valve movement by waves of one strength and to hold the valve stationary during the alternate waves of different strength.

4. In a milking machine system, in combination, teat cups, a pulsation pipe line, means to cause alternate pneumatic waves of different strength therein, a reciprocable pulsator valve adapted to connect each teat cup alternately with pressure and suction and to connect one teat cup with pressure while another is connected with suction, and means to effect a valve movement by waves of one strength and to hold the valve stationary during the alternate waves of different strength, whereby the pressure durations in the several teat cup chambers are equalized.

5. In a milking machine system, in combination, teat cups, a reciprocating pulsator valve adapted, in successive opposite movements, to connect each teat cup alternately with pressure and suction and at each movement to connect one teat cup with pressure while another is connected with suction, and means comprising primary pneumatic pulsations adapted to shift the valve in opposite directions, hold it stationary at the end of each shift, and equalize the dwells at the ends of opposite shifts, thereby equalizing the pressure durations in the several teat cups.

6. In a milking machine system, in combination, teat cups, a reciprocating pulsator valve adapted, in successive opposite movements, to connect each teat cup alternately with pressure and suction and at each movement to connect one teat cup with pressure while another is connected with suction, means to produce alternate vacuum pulsations of different strengths, and means to cause the valve to be shifted by the vacuum waves of one strength and to be held stationary during the vacuum waves of the other strength, thereby equalizing the durations of shift and equalizing the durations of dwell.

7. In a pneumatic milking machine operating system, in combination, a pipe line, means to cause vacuum waves therein, a milk pail, a set of two-chambered teat cups and a piston valve, means whereby vacuum waves exhaust air from the pail and one chamber of each cup and also operate the valve at half the wave frequency to connect the other chamber of each cup alternately with atmosphere and vacuum.

8. In a pneumatic milking machine operating system, in combination, a pipe line, means to cause vacuum waves therein, a milk pail, two two-chambered teat cups and a piston valve, means whereby vacuum waves exhaust air from the pail and the inner chamber of each cup and also operate the valve at half the wave frequency to connect the outer chamber of one cup with atmosphere and that of the other cup with vacuum and alternately therewith connect the outer chamber of one cup with vacuum and that of the other cup with the atmosphere.

9. In a milking machine system, a pulsator valve and valve chamber, a milk pail, two vacuum reservoirs, a passage, check valves between the passage and the milk pail and reservoirs, means to produce pneumatic pulsations in said passage, ports connecting pressure faces of the valve with the respective reservoirs, and ports adapted in the reciprocation of the valve to connect said passage alternately with opposite pressure surfaces of the valve.

10. A milking unit comprising a pail, a milk connection on the pail, a valve casing having a valve chamber therein, a valve arranged to reciprocate in said chamber, two vacuum reservoirs, said reservoirs being in communication respectively with opposite ends of the valve chamber, a pneumatic pulsation passage in said casing, check valve controlled ports arranged to permit air to be exhausted from the pail and the reservoirs to said passage, two teat cup chamber connections communicating with the valve chamber, a pneumatic pressure connection to the valve chamber, and ports adapted, in the reciprocation of the valve, to respectively connect opposite ends of the valve chamber with said passage.

11. In a pneumatic milking machine operating system, in combination, a pipe line, a continuously operated pump, means for causing the pump to set up alternate vacuum waves of different strength in said pipe line, a set of two-chambered teat cups, the milk pail, connections from the inner teat cup chambers to the pail, a valve casing, a reciprocating valve in a valve chamber in the casing, two valve controlling reservoirs, the reservoirs being in connection with respectively opposite ends of the valve chamber, a pulsation passage in connection with the pipe line, check valve controlled ports connecting said passage with the pail and each of said reservoirs, a connection from the outer teat cup chamber of one teat cup to the valve chamber, a similar connection from the valve chamber to the outer chamber of the other teat cup, and a pressure port communicating with the valve chamber, said valve being arranged to alternately open communication between said reservoirs and the outer teat cup chambers, between the outer teat cup chambers and the atmosphere, and between said passage and the ends of the valve chamber to shift the valve by the alternate vacuum waves of greater strength.

In testimony of which invention, I have hereunto set my hand, at Poughkeepsie, on this 22 day of October, 1920.

JOHN L. HULBERT.